(12) United States Patent
Weinberg et al.

(10) Patent No.: US 9,707,909 B2
(45) Date of Patent: Jul. 18, 2017

(54) DETERMINATION OF DEVIATION OF VEHICLE RANGE OR FUEL ECONOMY

(71) Applicant: GM GLOBAL TECHNOLOGY OPERATIONS LLC, Detroit, MI (US)

(72) Inventors: Richard B. Weinberg, Highland, MI (US); Todd P. Lindemann, Howell, MI (US); Rachel A. White, Lansing, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/856,379

(22) Filed: Sep. 16, 2015

(65) Prior Publication Data

US 2017/0072879 A1 Mar. 16, 2017

(51) Int. Cl.
*B60R 16/02* (2006.01)
*B60K 35/00* (2006.01)
*B60R 16/023* (2006.01)

(52) U.S. Cl.
CPC .......... *B60R 16/0236* (2013.01); *B60K 35/00* (2013.01); *B60K 2350/1092* (2013.01)

(58) Field of Classification Search
CPC .............. B60R 16/0236; B60K 35/00; B60K 2350/1092
USPC ........................................................ 701/123
See application file for complete search history.

(56) References Cited

U.S. PATENT DOCUMENTS

| | | | | |
|---|---|---|---|---|
| 6,453,731 B1 * | 9/2002 | Yaegashi | ................ | B60K 35/00 73/114.52 |
| 6,480,106 B1 * | 11/2002 | Crombez | ............ | B60R 16/0232 340/438 |
| 6,961,656 B2 * | 11/2005 | Kim | ........................ | F02D 29/02 701/123 |
| 7,237,203 B1 * | 6/2007 | Kuenzner | .............. | B60K 35/00 701/123 |
| 8,228,180 B2 * | 7/2012 | Levy | ...................... | B60K 35/00 340/425.5 |
| 8,477,022 B2 * | 7/2013 | Taguchi | ................. | B60K 35/00 340/438 |
| 8,666,576 B2 * | 3/2014 | Kim | ........................ | G07C 5/004 180/65.21 |
| 8,812,224 B1 * | 8/2014 | Heitmann | ................ | G07C 5/08 701/123 |
| 8,874,344 B2 * | 10/2014 | Aldighieri | ................. | B60T 1/10 116/28 R |
| 8,907,811 B2 * | 12/2014 | Windstrup | ............ | B60L 11/184 236/94 |
| 9,378,595 B2 * | 6/2016 | Esler | ...................... | G07C 5/004 |
| 2005/0128065 A1 * | 6/2005 | Kolpasky | ................ | G09F 21/04 340/461 |
| 2005/0278079 A1 * | 12/2005 | Maguire | .............. | G07C 5/0858 701/1 |

(Continued)

*Primary Examiner* — Tyler J Lee
(74) *Attorney, Agent, or Firm* — Lorenz & Kopf, LLP (57) ABSTRACT

Methods and systems for determining deviations is expected range, expected fuel economy, or both, for a vehicle. In accordance with one embodiment, a system includes a sensor unit and a processor. The sensor unit is configured to at least facilitate obtaining inputs for one or more factors having an effect on energy performance and/or fuel efficiency for a vehicle. The processor is coupled to the sensor unit, and is configured to at least facilitate determining a change in expected range for the vehicle from the one or more factors based on the inputs.

17 Claims, 3 Drawing Sheets

(56) References Cited

U.S. PATENT DOCUMENTS

| | | | | |
|---|---|---|---|---|
| 2010/0042340 A1* | 2/2010 | Piszko | ................... | G01F 9/008 |
| | | | | 702/55 |
| 2010/0207755 A1* | 8/2010 | Watson | ................. | B60K 35/00 |
| | | | | 340/450.2 |
| 2010/0305984 A1* | 12/2010 | Ben-Yitschak | ...... | G06Q 10/025 |
| | | | | 705/6 |
| 2012/0116606 A1* | 5/2012 | Ichinokawa | ........... | B60K 35/00 |
| | | | | 701/1 |
| 2012/0179420 A1* | 7/2012 | Gilman | ................. | B60K 35/00 |
| | | | | 702/165 |
| 2013/0253740 A1* | 9/2013 | Kim | ....................... | B60L 1/003 |
| | | | | 701/22 |
| 2016/0063772 A1* | 3/2016 | Esler | ..................... | G07C 5/004 |
| | | | | 701/123 |

* cited by examiner

DETERMINATION OF DEVIATION OF VEHICLE RANGE OR FUEL ECONOMY

TECHNICAL FIELD

The present disclosure generally relates to vehicles, and more particularly relates to methods and systems for determining a deviation in vehicle range or fuel economy.

BACKGROUND

Today's vehicles, such as automobiles, utilize various forms of energy, such as gasoline, battery, and/or electric forms of energy. Certain vehicles today include an indication of energy performance for the vehicle. However, in certain instances it may be desirable to provide improved measures of energy performance.

Accordingly, it is desirable to provide improved techniques for providing energy performance for vehicles. It is also desirable to provide methods, systems, and vehicles utilizing such techniques. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided. The method comprises obtaining inputs for one or more factors having an effect on energy performance for a vehicle, and determining a change in expected range, expected fuel economy, or both, for the vehicle from the one or more factors based on the inputs.

In accordance with another exemplary embodiment, a system is provided. The system comprises a sensor unit and a processor. The sensor unit is configured to at least facilitate obtaining inputs for one or more factors having an effect on energy performance for a vehicle. The processor is coupled to the sensor unit, and is configured to at least facilitate determining a change in expected range, expected fuel economy, or both for the vehicle from the one or more factors based on the inputs.

In accordance with a further exemplary embodiment, a vehicle is provided. The vehicle comprises a body, a sensor unit, and a processor. The sensor unit is disposed at least partially within the body, and is configured to at least facilitate obtaining inputs for one or more factors having an effect on energy performance for a vehicle. The processor is also disposed at least partially within the body. The processor is coupled to the sensor unit, and is configured to at least facilitate determining a change in expected range, expected fuel economy, or both for the vehicle from the one or more factors based on the inputs.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
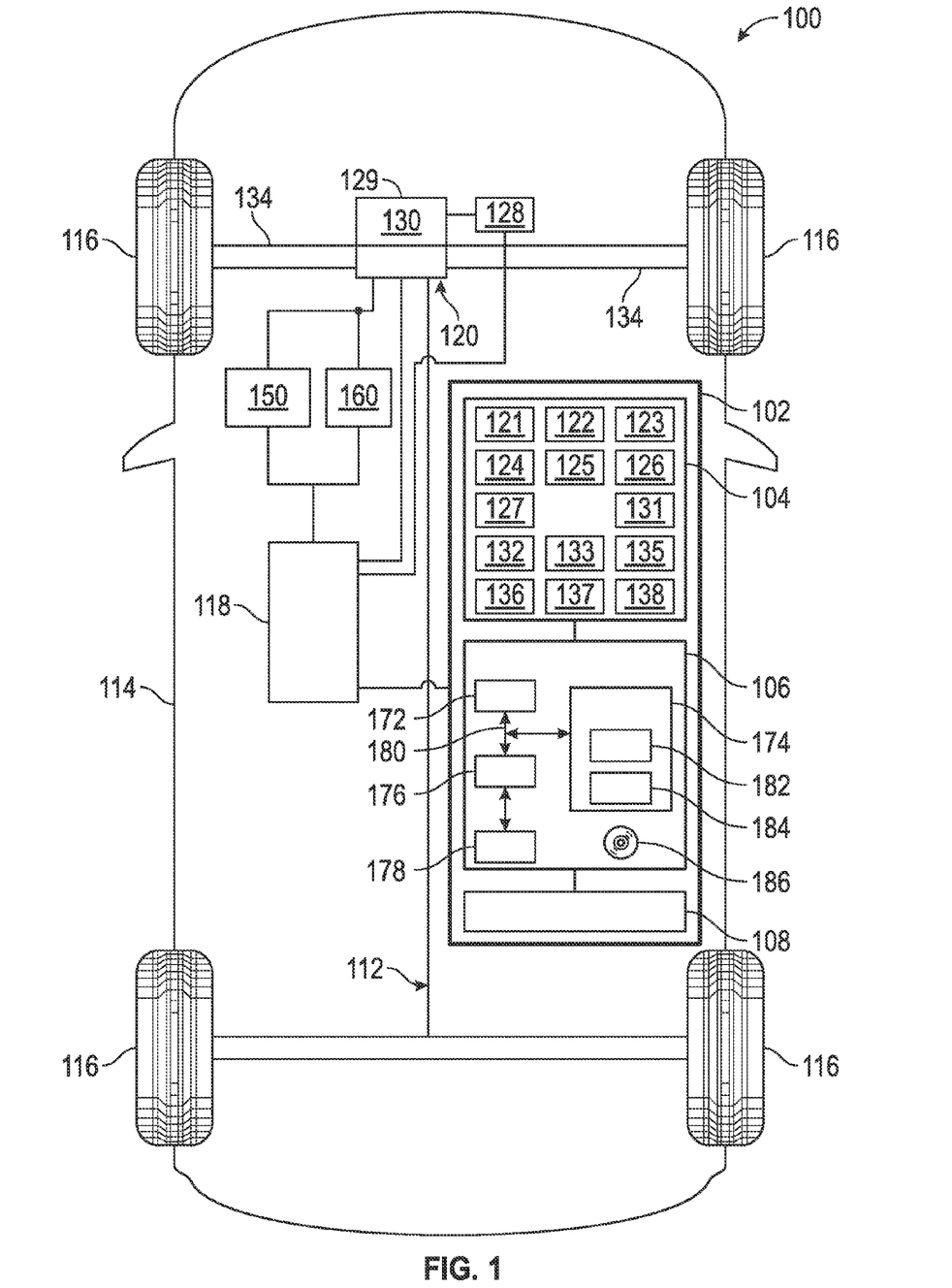
FIG. 1 is a functional block diagram of a vehicle that includes a control system for determining vehicle range deviations, in accordance with an exemplary embodiment.

FIG. 1 illustrates a vehicle 100, or automobile, according to an exemplary embodiment. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). In addition, in certain embodiments, the vehicle 100 may comprise any one of a number of other types of vehicles.

As described in greater detail further below, the vehicle 100 includes a control system 102 for assessing energy performance of the vehicle 100. Specifically, as discussed further below, the control system 102 obtains inputs for one or more factors having an effect on energy performance for a vehicle, and determines a change in expected range for the vehicle from the one or more factors based on the inputs. In the depicted embodiment, the control system 102 includes a sensor array 104, a controller 106, and a display 108. In various embodiments, the controller 106 controls the assessment of the energy performance of the vehicle 100 for the control system 102 in accordance with the steps set forth further below in connection with the process 200 of FIGS. 2-4.

As depicted in FIG. 1, the vehicle 100 includes, in addition to the above-referenced control system 102, a chassis 112, a body 114, four wheels 116, an electronic control system 118, a steering system 150, and a braking system 160. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114. In various embodiments the vehicle 100 may differ from that depicted in FIG. 1. For example, in certain embodiments the number of wheels 116 may vary. By way of additional example, in various embodiments the vehicle 100 may not have a steering system, and for example may be steered by differential braking, among various other possible differences.

In the exemplary embodiment illustrated in FIG. 1, the vehicle 100 includes an actuator assembly 120. The actuator assembly 120 includes at least one propulsion system 129 mounted on the chassis 112 that drives the wheels 116. In one the depicted embodiment, the actuator assembly 120 includes an engine and/or motor 130. In one embodiment, the motor/engine 130 comprises an electric motor/generator that is powered by a rechargeable energy storage system (RESS) 128 (e.g., a vehicle battery). In another embodiment, the motor/engine 130 comprises a gasoline combustion engine. In other embodiments, the motor/engine 130 may include one or more other of these and/or other types of engines and/or motors. In certain embodiments, the electronic control system 118 comprises a motor/engine control system that controls the motor/engine 130 and/or one or more other systems of the vehicle 100.

Still referring to FIG. 1, the motor/engine 130 is coupled to at least some of the wheels 116 through one or more drive shafts 134. In some embodiments, the motor/engine 130 is mechanically coupled to the transmission. In other embodiments, the motor/engine 130 may instead be coupled to a generator used to power an electric motor that is mechanically coupled to the transmission. In certain other embodiments (e.g. electrical vehicles), an engine and/or transmission may not be necessary.

The steering system 150 is mounted on the chassis 112, and controls steering of the wheels 116. In the depicted embodiment, the steering system 150 includes a steering wheel and a steering column (not depicted). In certain embodiments, an autonomous vehicle may utilize steering commands that are generated by a computer, with no involvement from the driver.

The braking system 160 is mounted on the chassis 112, and provides braking for the vehicle 100. The braking system 160 receives inputs from the driver via a brake pedal (not depicted), and provides appropriate braking via brake units (also not depicted). The driver also provides inputs via an accelerator pedal (not depicted) as to a desired speed or acceleration of the vehicle, as well as various other inputs for various vehicle devices and/or systems, such as one or more vehicle radios, other entertainment systems, environmental control systems, lighting units, navigation systems, and the like (also not depicted). Similar to the discussion above regarding possible variations for the vehicle 100, in certain embodiments steering, braking, and/or acceleration can be commanded by a computer instead of by a driver.

The control system 102 is mounted on the chassis 112. As discussed above, the control system 102 obtains inputs for one or more factors having an effect on energy performance for a vehicle, and determines a change in expected range for the vehicle from the one or more factors based on the inputs. Also as noted above and depicted in FIG. 1, in one embodiment the control system 102 comprises a sensor array 104, a controller 106, and a display 108.

The sensor array 104 includes various sensors (also referred to herein as sensor units and/or detection units) that are used for monitoring the vehicle 100, the driver of the vehicle 100, and/or one or more conditions proximate the vehicle 100 for use as inputs in determining the change in the expected range for the vehicle 100. In the depicted embodiment, the sensor array includes the following: one more accelerometers 121 (e.g. for measuring vehicle 100 acceleration), speed sensors 122 (e.g. for measuring a speed of the vehicle 100, for example via wheel speeds and/or other vehicle speeds), brake sensors 123 (e.g. for monitoring a driver's engagement of the brake pedal of the vehicle 100, such as via brake pedal force and/or brake pedal travel sensors), accelerator pedal sensors 124 (e.g. for monitoring a driver's engagement of the accelerator pedal of the vehicle 100, such as via accelerator pedal force and/or accelerator pedal travel sensors), steering sensors 125 (e.g. for monitoring a driver's engagement of the steering wheel of the vehicle 100 via one or more steering angle sensors), temperature sensors 126 (e.g. for measuring an ambient temperature outside the vehicle 100), location sensors 127 (e.g. global position system, or GPS, systems and/or components), environmental sensors 131 (e.g. for detecting wind, rain, and/or other conditions outside and/or proximate the vehicle 100), energy sensors 132 (e.g. for detecting usage of, and remaining amounts of, gasoline, fuel, battery power, electric power, and/or other energy types), powertrain sensors 133 (e.g. for monitoring the powertrain of the vehicle 100), vehicle environmental control sensors 135 (e.g. for measuring heating and/or cooling power being requested and/or consumed via instructions provided by occupants of the vehicle 100), wheel torque sensors 136, vehicle bearing sensors 137 (e.g. for measuring a weight and/or mass of the vehicle 100), and terrain sensors 138 (e.g. for determining hills and/or other terrain surrounding the vehicle 100), It will be appreciated that the specific types of sensors in the sensor array 104 may vary in different embodiments.

In various embodiments, the sensor array 104 provides the detected information to the controller 106 for processing, for example as set forth in greater detail below. Also in various embodiments, the sensor array 104 performs these and other functions in accordance with the steps of the process 200 described further below in connection with FIGS. 2-4.

The controller 106 is coupled to the sensor array 104 and to the display 108. The controller 106 utilizes the various measurements and information from the sensor array 104 as inputs, and determines a change in expected range for the vehicle from the one or more factors based on the inputs. The controller 106 also provides instructions to the display 108 to provide the results of the change in expected range for the driver and/or other occupants of the vehicle 100. In various embodiments, the controller 106, along with the sensor array 104 and the display 108, provide these and other functions in accordance with the steps discussed further below in connection with the schematic drawings of the vehicle 100 in FIG. 1 and the flowcharts and schematic drawings pertaining to the process 200 in FIGS. 2-4, discussed further below.

As depicted in FIG. 1, the controller 106 comprises a computer system. In certain embodiments, the controller 106 may also include one or more of the sensors of the sensor array 104, one or more other devices and/or systems, and/or components thereof. In addition, it will be appreciated that the controller 106 may otherwise differ from the embodiment depicted in FIG. 1. For example, the controller 106 may be coupled to or may otherwise utilize one or more remote computer systems and/or other control systems, such as the electronic control system 118 and/or the steering system 150 of FIG. 1, and/or one or more other systems of the vehicle 100.

In the depicted embodiment, the computer system of the controller 106 includes a processor 172, a memory 174, an interface 176, a storage device 178, and a bus 180. The processor 172 performs the computation and control functions of the controller 106, and may comprise any type of processor or multiple processors, single integrated circuits such as a microprocessor, or any suitable number of integrated circuit devices and/or circuit boards working in cooperation to accomplish the functions of a processing unit. During operation, the processor 172 executes one or more programs 182 contained within the memory 174 and, as such, controls the general operation of the controller 106 and the computer system of the controller 106, generally in executing the processes described herein, such as the process 200 described further below in connection with FIGS. 2-4.

The memory 174 can be any type of suitable memory. For example, the memory 174 may include various types of dynamic random access memory (DRAM) such as SDRAM, the various types of static RAM (SRAM), and the various types of non-volatile memory (PROM, EPROM, and flash). In certain examples, the memory 174 is located on and/or co-located on the same computer chip as the processor 172. In the depicted embodiment, the memory 174 stores the above-referenced program 182 along with one or more stored values 184.

The bus 180 serves to transmit programs, data, status and other information or signals between the various components of the computer system of the controller 106. The interface 176 allows communication to the computer system of the controller 106, for example from a system driver and/or another computer system, and can be implemented using any suitable method and apparatus. In one embodiment, the interface 176 obtains the various data from the sensors of the sensor array 104. The interface 176 can include one or more network interfaces to communicate with other systems or components. The interface 176 may also include one or more network interfaces to communicate with technicians, and/or one or more storage interfaces to connect to storage apparatuses, such as the storage device 178.

The storage device 178 can be any suitable type of storage apparatus, including direct access storage devices such as hard disk drives, flash systems, floppy disk drives and optical disk drives. In one exemplary embodiment, the storage device 178 comprises a program product from which memory 174 can receive a program 182 that executes one or more embodiments of one or more processes of the present disclosure, such as the steps of the process 200 (and any sub-processes thereof) described further below in connection with FIGS. 2-4. In another exemplary embodiment, the program product may be directly stored in and/or otherwise accessed by the memory 174 and/or a disk (e.g., disk 186), such as that referenced below.

The bus 180 can be any suitable physical or logical means of connecting computer systems and components. This includes, but is not limited to, direct hard-wired connections, fiber optics, infrared and wireless bus technologies. During operation, the program 182 is stored in the memory 174 and executed by the processor 172.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 172) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 106 may also otherwise differ from the embodiment depicted in FIG. 1, for example in that the computer system of the controller 106 may be coupled to or may otherwise utilize one or more remote computer systems and/or other control systems.

The display 108 is coupled to the controller 106, and provides notifications for the driver of the vehicle 100. Specifically, the display 108 provides notifications, for the driver and/or other occupants of the vehicle 100, as to energy performance in terms of a change in expected range for the vehicle from the one or more factors based on the inputs. In certain embodiments, the display 108 provides these notifications via a visual display screen within the vehicle 100. In other embodiments, the display 108 provides these notifications via an audio message within the vehicle 100. In certain embodiments, the display 108 may provide visual and audio notifications, and/or one or more other types of notifications (e.g. haptic notifications, notifications sent to a user's mobile device, and/or any number of other different types of notifications). Also in various embodiments, the display 108 performs these and other functions in accordance with the steps of the process 200 described further below in connection with FIGS. 2-4.

While the components of the control system 102 (including the sensor array 104, the controller 106, and the display 108) are depicted as being part of the same system, it will be appreciated that in certain embodiments these features may comprise two or more systems. In addition, in various embodiments the control system 102 may comprise all or part of, and/or may be coupled to, various other vehicle devices and systems, such as, among others, the actuator assembly 120, the electronic control system 118, the steering system 150, and/or one or more other systems of the vehicle 100.

Figure 2:
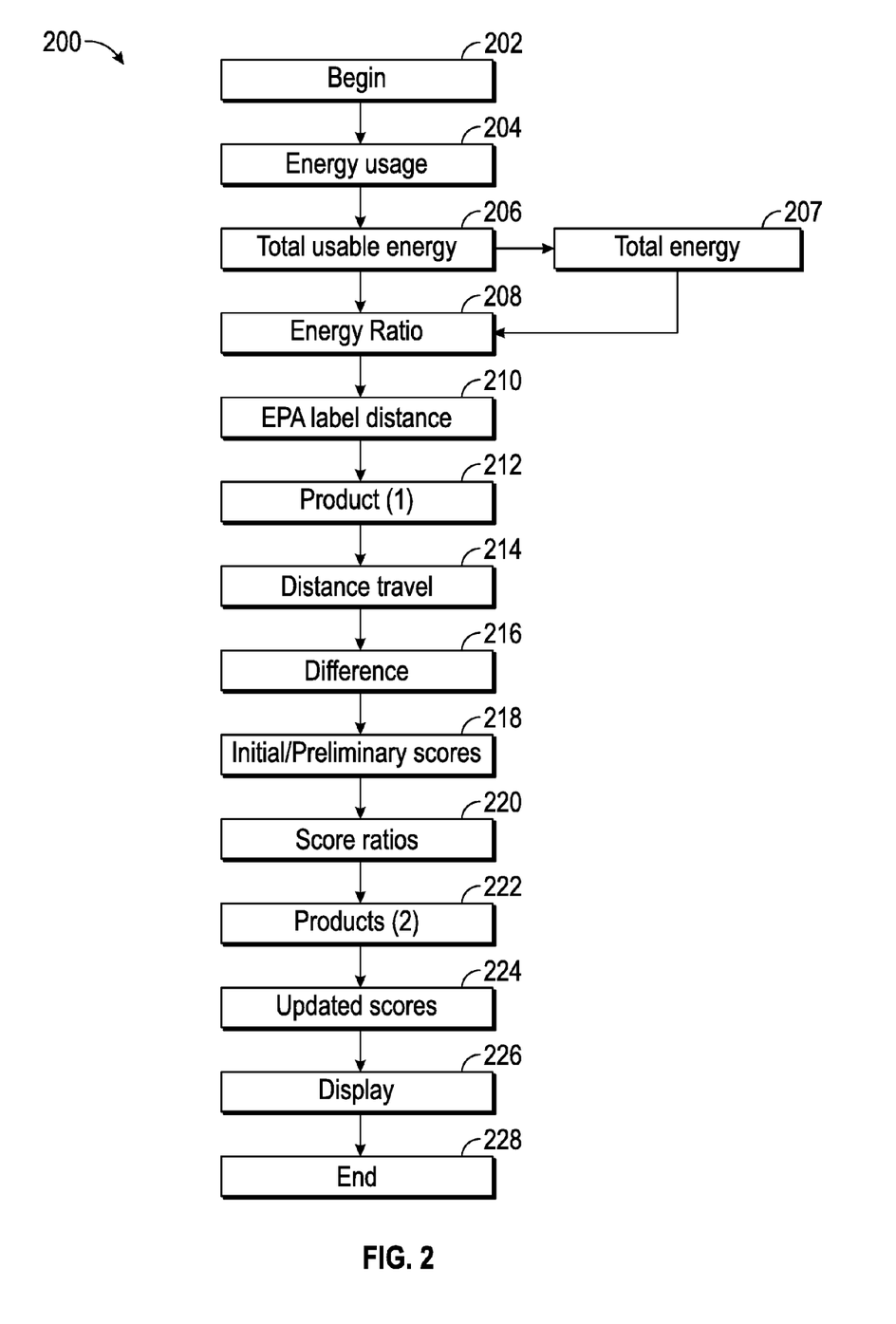
FIGS. 2 and 3 are flowcharts of a process for determining vehicle range deviations, and that can be used in connection with the vehicle of FIG. 1, in accordance with an exemplary embodiment.
Figure 3:
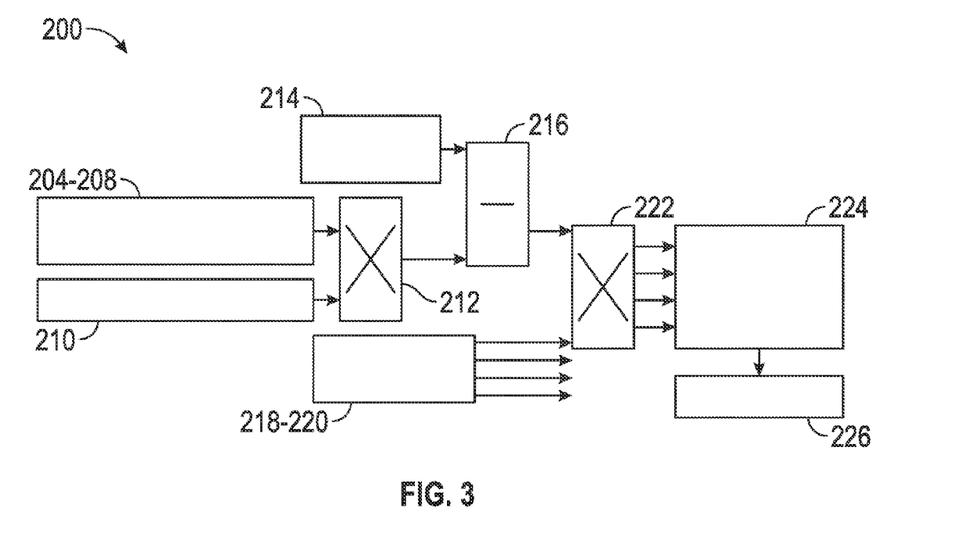

FIGS. 2 and 3 are flowcharts of a process 200 for assessing energy performance of the vehicle 100, in accordance with an exemplary embodiment. The process 200 can be implemented in connection with the vehicle 100 of FIG. 1, in accordance with an exemplary embodiment.

As depicted in FIGS. 2 and 3, the process 200 is initiated at step 202. For example, in various embodiments, the process 200 may be initiated when the vehicle 100 starts in a driving mode. In one embodiment, the process 200 is initiated when a driver has engaged an ignition of the vehicle 100 (e.g. by turning a key of the ignition, pressing a start button, and/or engaging a keyfob). In one embodiment, the process 200 continues throughout the ignition cycle or vehicle drive.

A measurement and/or determination is made as to an amount of energy usage for the vehicle (step 204). In one embodiment, this corresponds to an amount of energy that has been used from a vehicle energy source during the current vehicle drive or ignition cycle. In one embodiment, an amount of gasoline/fuel energy consumption is measured and/or determined for the vehicle drive. In another embodiment, an amount of battery energy consumption is measured and/or determined for the vehicle drive. In yet another embodiment, an amount of electric energy consumption is measured and/or determined for the vehicle drive. In various other embodiments, amounts of one or more other types of energy consumption may be determined and/or measured (e.g. depending upon the type(s) of energy source(s) used by the vehicle). In various embodiments, the amount of energy usage is measured via one or more energy sensors 132 of FIG. 1. In certain embodiments, the amount of energy usage is determined via the processor 172 of FIG. 1 via data/inputs obtained from one or more energy sensors 132 of FIG. 1.

A measurement and/or determination is made as to an amount of total usage energy remaining for the vehicle (step 206). In one embodiment, this corresponds to an amount of energy remaining from the vehicle energy source after the usage of energy in the current vehicle drive or ignition cycle of step 204. In one embodiment, a remaining amount of gasoline/fuel from a fuel tank of the vehicle is measured and/or determined. In another embodiment, a remaining amount of battery energy from a vehicle battery is measured and/or determined. In yet another embodiment, a remaining amount of electric energy from an electrical source is measured and/or determined. In various other embodiments, amounts of one or more other types of energy consumption may be determined and/or measured (e.g. depending upon the type(s) of energy source(s) used by the vehicle). In various embodiments, the amount of total usable energy is measured via one or more energy sensors 132 of FIG. 1. In certain embodiments, the amount of total usable energy is determined via the processor 172 of FIG. 1 via data/inputs obtained from one or more energy sensors 132 of FIG. 1.

A determination is made as to an amount of total used and unused energy for the vehicle (step 207). In one embodiment, this corresponds to a sum of the energy usage from step 204 and the energy remaining from step 206. In one embodiment, this value is calculated by the processor 172 of FIG. 1.

An energy ratio is determined (step 208). Specifically, in accordance with one embodiment, a calculation is made as to a ratio of total energy usage from the current vehicle drive (from step 204) to the sum (from step 207) of the total energy of step 206 and the total energy usage from the current vehicle drive of step 204. In one embodiment, the processor 172 of FIG. 1 calculates the energy ratio by dividing the energy usage value of step 204 by the total available energy value from step 206.

An expected range for the vehicle is obtained (step 210). In various embodiments, the expected range comprises an estimated range for the vehicle as provided by a governmental regulatory agency (e.g., in the United State, the Environmental Protection Agency (EPA)). For example, in one embodiment, for electric and/or battery powered vehicles, the estimated range may comprise an expected distance (e.g. an expected number of miles) the vehicle is expected to travel under a single battery charge (and/or under a specific amount of battery and/or electric energy). By way of an additional example, in one embodiment, for gasoline-powered vehicles the expected range may comprise an average distance per amount of fuel (e.g. miles per gallon) to be expected for the particular vehicle (e.g. in the city, on highways, or a combination of both). In one embodiment, the expected range is stored as one of the stored values 184 in the memory 174 of FIG. 1 onboard the vehicle 100 of FIG. 1, and is obtained from the memory 174 by the processor 172 of FIG. 1.

A first product is determined (step 212). In one embodiment, the first product of step 212 is calculated for the energy ratio of step 208 and the expected distance of step 210. Specifically, in one embodiment, the processor 172 of FIG. 1 determines the product by multiplying the energy ratio of step 208 by the expected distance of step 210.

In addition, a distance travelled is obtained (step 214). In one embodiment, a measurement or determination is made as to the total amount of distance travelled by the vehicle during the current vehicle drive or ignition cycle (i.e. corresponding to the energy usage during the same time period, as represented in step 204). In one embodiment, the total amount of distance is measured via one or more of the location sensors 127 of FIG. 1 (via a GPS system and/or components thereof), and/or via one or more wheel torque sensors 136 of FIG. 1. In another embodiment, the total amount of distance is determined via the processor 172 of FIG. 1 via inputs that were obtained from and/or measured via one or more of the location sensors 127 of FIG. 1 (via a GPS system and/or components thereof), and/or via one or more wheel torque sensors 136 of FIG. 1.

In addition, a difference in distance is determined (step 216). In one embodiment, the difference in distance comprises a difference between an actual distance travelled by the vehicle and an expected distance for the vehicle to have travelled. Also in one embodiment, the processor 172 of FIG. 1 calculates the difference in distance of step 216 by subtracting the product of step 212 by the actual distance travelled of step 214.

Initial energy scores are obtained (step 218). In one embodiment, initial or preliminary energy scores are obtained for various factors that may affect vehicle energy usage of the vehicle. In certain embodiments, the factors may include a driver's technique (e.g. a driver's application of the steering wheel, brake pedal, and/or accelerator pedal, for example, indicating whether the driver habits would tend to be efficient or inefficient for energy usage purposes), terrain (e.g. the type of road, including whether the road is on an incline or decline, and/or whether the road is straight or curved, and/or whether the road is dirt or paved, and so on), climate settings (e.g. the climate settings for an environmental control system for heating and/or cooling the vehicle, as set by vehicle occupants, and/or measures of operation of the environmental control system), vehicle/cargo mass (either additional weight due to on board load or additional towing mass such as trailering/towing), and outside environment (e.g. ambient temperature, and/or wind, rain, and/or other weather and/or environmental conditions outside the vehicle). Also in certain embodiments, the initial energy score for each factor comprises a measure of an effect (e.g. an amount of a positive effect or a negative effect) on fuel efficiency for the particular factor. In addition, in certain embodiments, the initial energy scores are determined by the processor 172 of FIG. 1 using the data (i.e. inputs) collected from the various sensors of the sensor array 104 of FIG. 1 (e.g., in monitoring the driver's engagement of the brake pedal, accelerator pedal, and steering wheel, the climate control settings for the vehicle, the movement (including speed, acceleration, deceleration, and turning) of the vehicle, temperature, wind, and other environmental conditions for the vehicle, features of the terrain surrounding the vehicle, and so). For example, in one embodiment, an aggressive driver who actively and/or abruptly uses the vehicle's brake pedal, accelerator pedal, and steering wheel relatively more aggressively may be provided an initial score with a relatively high negative value, whereas a cautious driver who more carefully or gradually actively uses the vehicle's brake pedal, accelerator pedal, and steering wheel may be provided an initial score with a relatively high positive value as part of a "technique" factor. By way of additional example, under a "terrain" factor, if the vehicle is moving downhill or with a tail wind, then a positive score is likely to result for this factor, whereas a negative value is likely to result if the vehicle is travelling uphill or with a headwind. Similarly, other factors such as "climate settings", "outside temperature", and so on, can be provided values based on their known effects on fuel efficiency (e.g. if air conditioning settings are turned up high and the outside temperature is very hot, this can result in reduced fuel efficiency and thus a negative score, and so on).

Energy score ratios are determined (step 220). In one embodiment, for each factor, the score ratio comprises a measure of the initial energy score for the particular factor in comparison to an aggregate initial score for all of the factors, combined together. For example, in one embodiment in which a first factor had an initial score of +2, a second factor had an initial score of +1, a third factor had an initial score of −1, and a fourth factor had an initial score of +3, then the aggregate initial score would equal +5, and the respective ratios would be determined as follows: (i) the ratio for the first factor would be equal to +2/5; (ii) the ratio for the second factor would be +1/5; (iii) the ratio for the third factor would be −1/5; and (iv) the ratio for the fourth factor would be +3/5. In one embodiment, the score ratios are calculated by the processor 172 of FIG. 1 by dividing the initial score for each factor by the aggregate initial score for the combination of factors, for example in the manner discussed above.

Second products are determined (step 220). In one embodiment, for each factor, the energy score ratio for each factor of step 220 first product of step 212 is multiplied by the difference in distance of step 216. Also in one embodiment, this step is performed by the processor 172 of FIG. 1.

For each factor, the respective second product is considered an updated score for the factor (step 224), for example by the processor 172 of FIG. 1. Specifically, the updated score for each factor represents a measurement of a change in expected range (positive or negative) as a result of the factor. In certain examples, the change in expected range refers to a specific unit of distance (e.g. in miles or kilometers). For example, if a particular factor has an updated score of +1, then this factor is deemed to contribute an extra mile for the current range of the vehicle (e.g. the amount of distance travelled by a vehicle for a full electric charge in the case of an electric vehicle, or on a full tank of gasoline for a gasoline-powered vehicle, and so on). In other examples, the change in expected range may refer instead to a distance per unit of fuel (e.g. miles per gallon, kilometers per liter), and so on. In addition, in certain embodiments, the respective second products of two or more factors may also be aggregated such that the aggregated second products represent a change in expected range for the vehicle from the combination of factors.

The updated scores are displayed (step 226). In various embodiments, the updated scores of step 226, for each factor, are displayed via the display 108 of FIG. 1 in accordance with instructions provided thereto by the processor 172 of FIG. 1. In one embodiment, a visual display is provided for viewing by the driver on a display screen of the display 108 with in the vehicle 100. In other embodiments, an audio message may be provided within the vehicle 100, and/or one or more other notifications may be provided (e.g. notifications sent to a user's mobile device, and/or any number of other different types of notifications), alone or in addition to other types of notices (e.g. the visual notice described above). In one embodiment, the process repeats throughout each vehicle drive or ignition cycle, and terminates in step 228 once the vehicle drive or ignition cycle is over.

Figure 4:
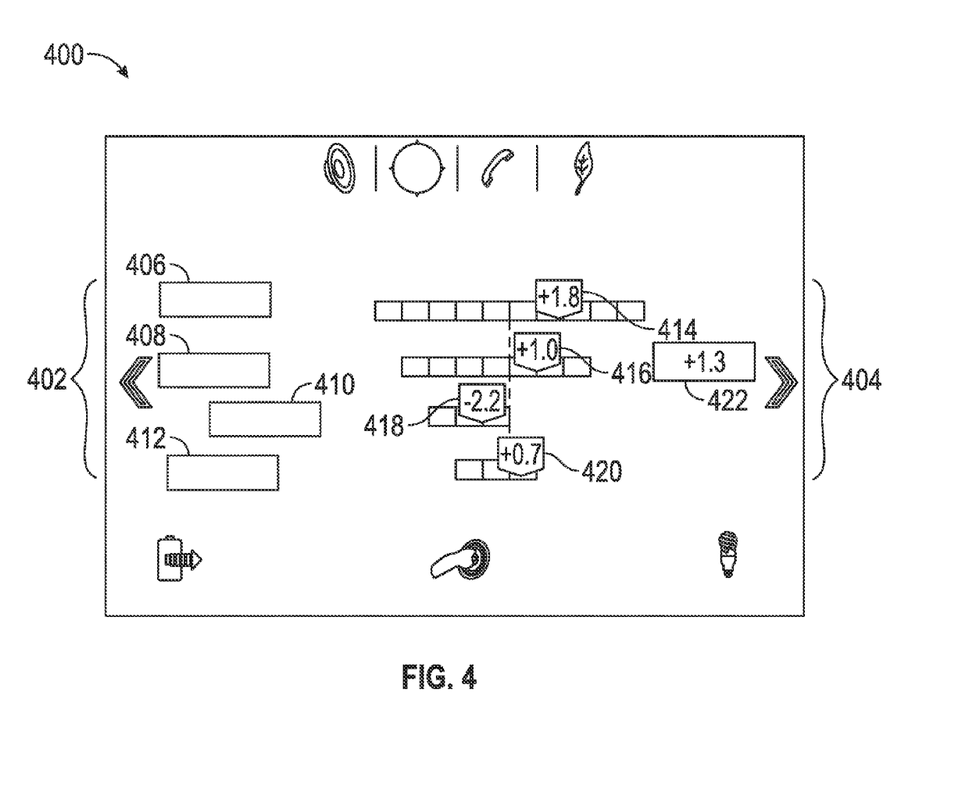
FIG. 4 is an illustration of a driver display that can be used in connection with the process of FIGS. 2 and 3 and the vehicle of FIG. 1, in accordance with an exemplary embodiment.

FIG. 4 is an illustration of a driver display screen 400 that can be used in connection with the process 200, in accordance with an exemplary embodiment. In one embodiment, the driver display screen 400 may be part of the display 108 of FIG. 1, and receive instructions from the processor 172 of FIG. 1. In FIG. 4, various factors 402 are depicted along with various corresponding scores 404. In the example of FIG. 4, four factors 402 are used with a possible effect on the energy efficiency for the vehicle, namely: (i) technique (406), (ii) terrain (408), (iii) climate settings (410), and (iv) outside temperature (412) (e.g. similar to the examples discussed above). The scores 404 depicted in FIG. 4 correspond to the respective updated scores from step 224 of FIGS. 2 and 3 for each factor 402. In the illustration of FIG. 4, the technique factor (406) has a score (414) of 1.8, and is determined to add 1.8 miles to the range of vehicle in this example. Also in this example, the terrain factor (408) has a score (416) of 1.0, and is determined to add 1.0 miles to the range of the vehicle. In addition, in this example, the climate settings factor (410) has a score (418) of −2.2, and is determined to reduce the range of the vehicle by 2.2 miles. Finally, in this example, the outside temperature factor (412) has a score (420) of +0.7, and is determined to add 0.7 miles to the range of the vehicle. Also as depicted in FIG. 4, a total (or aggregate) score 422 represents a total, or aggregate score of all the factors combined. In the example of FIG. 4, the total score 422 is +1.3, and is determined to add 1.3 miles to the range of the vehicle based on the combined effect of the various factors 402. It will be appreciated that the types of factors, and the values thereof, will vary in different embodiments and implementations.

Accordingly, methods, systems, and vehicles are provided for assessing energy performance of a vehicle. The disclosed methods, systems, and vehicle provide values for the effects of various factors on the expected range of the vehicle.

It will be appreciated that the disclosed methods, systems, and vehicles may vary from those depicted in the Figures and described herein. For example, the vehicle 100, the control system 102, and/or various components thereof may vary from that depicted in FIG. 1 and described in connection therewith. In addition, it will be appreciated that certain steps of the process 200 may vary from those depicted in FIGS. 2-4 and/or described above in connection therewith. It will similarly be appreciated that certain steps of the methods described above may occur simultaneously or in a different order than that depicted in FIGS. 2-4 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

What is claimed is:

1. A method comprising:
   obtaining inputs, via one or more sensors, for one or more factors having an effect on energy performance for a vehicle; and
   determining, via a processor, a change in expected range for the vehicle, a change in expected fuel economy for the vehicle, or both, from the one or more factors based on the inputs;
   wherein the step of determining the change in expected range, the change in expected fuel economy, or both, comprises determining a difference between an actual distance travelled by the vehicle and an expected distance for the vehicle to travel, the difference based on the one or more factors, using the inputs;
   wherein the difference is determined at least in part by:
      determining a ratio of energy usage to total available energy;
      calculating a product of the ratio and the expected distance; and
      subtracting the product from the actual distance travelled.

2. The method of claim 1, wherein the expected range comprises an estimation of the range for the vehicle as provided by a governmental agency.

3. The method of claim 1, wherein the step of determining the change in expected range further comprises determining a difference between an actual fuel efficiency for the vehicle and an expected fuel efficiency for the vehicle to travel, the difference based on the one or more factors, using the inputs.

4. The method of claim 1, wherein:
the step of obtaining inputs comprises obtaining inputs for a plurality of different factors having an effect on energy performance for a vehicle; and
the step of determining the change in expected range comprises determining a respective change in expected range for the vehicle from each of the different factors based on the inputs.

5. The method of claim 4, wherein:
the step of obtaining inputs comprises obtaining an efficiency score for each of the plurality of different factors; and
the step of determining the respective changes in expected range comprises:
determining a total difference between an actual distance travelled by the vehicle and an expected distance for the vehicle to travel due to a combination of the plurality of factors; and
determining, for each of the factors, a respective ratio of the efficiency score for the factor compared with an aggregate efficiency score for the combination of the plurality of factors in totality; and
for each of the factors, multiplying the respective ratio for the factor by the total difference.

6. The method of claim 4, further comprising:
displaying, for a driver of the vehicle, the respective change in expected range for each of the plurality of factors.

7. The method of claim 6, wherein the plurality of factors comprises a technique factor, a terrain factor, a climate setting factor, and an outside temperature factor.

8. A system comprising:
a sensor unit configured to at least facilitate obtaining inputs for one or more factors having an effect on energy performance for a vehicle; and
a processor coupled to the sensor unit, the processor configured to at least facilitate determining a change in expected range, a change in expected fuel economy, or both, for the vehicle from the one or more factors based on the inputs, wherein the processor is configured to at least facilitate determining the change in expected range by determining a difference between an actual distance travelled by the vehicle and an expected distance for the vehicle to travel, the difference based on the one or more factors, using the inputs, wherein the processor is configured to at least facilitate determining the difference at least in part by:
determining a ratio of energy usage to total available energy;
calculating a product of the ratio and the expected distance; and
subtracting the product from the actual distance.

9. The system of claim 8, wherein the expected range comprises an estimation of the range for the vehicle as provided by a governmental agency.

10. The system of claim 8, wherein the processor is configured to at least facilitate determining the change in expected range by determining a difference between an actual fuel efficiency for the vehicle and an expected fuel efficiency for the vehicle to travel, the difference based on the one or more factors, using the inputs.

11. The system of claim 8, wherein:
the sensor unit is configured to at least facilitate obtaining inputs for a plurality of different factors having an effect on energy performance for a vehicle; and
the processor is configured to at least facilitate determining a respective change in expected range for the vehicle from each of the different factors based on the inputs.

12. The system of claim 11, wherein:
the sensor unit is configured to at least facilitate obtaining an efficiency score for each of the plurality of different factors; and
the processor is configured to at least facilitate determining the respective changes in expected range by:
determining a total difference between an actual distance travelled by the vehicle and an expected distance for the vehicle to travel due to a combination of the plurality of factors; and
determining, for each of the factors, a respective ratio of the efficiency score for the factor compared with an aggregate efficiency score for the combination of the plurality of factors in totality; and
for each of the factors, multiplying the respective ratio for the factor by the total difference.

13. The system of claim 11, further comprising:
a display coupled to the processor, the display configured to at least facilitate displaying, for a driver of the vehicle based on instructions provided by the processor, the respective change in expected range for each of the plurality of factors.

14. The system of claim 11, wherein the plurality of factors comprises a technique factor, a terrain factor, a climate setting factor, and an outside temperature factor.

15. A vehicle comprising:
a body;
a sensor unit disposed at least partially within the body and configured to at least facilitate obtaining inputs for a plurality of different factors having an effect on energy performance for a vehicle; and
a processor disposed at least partially within the body, the processor coupled to the sensor unit, the processor configured to at least facilitate determining a respective change in expected range, a respective change in expected fuel economy, or both, for the vehicle from each of the different factors based on the inputs, by:
determining a total difference between an actual distance travelled by the vehicle and an expected distance for the vehicle to travel due to a combination of the plurality of factors;
determining, for each of the factors, a respective ratio of the efficiency score for the factor compared with an aggregate efficiency score for the combination of the plurality of factors in totality; and
for each of the factors, multiplying the respective ratio for the factor by the total difference.

16. The vehicle of claim 15, further comprising:
a display coupled to the processor;
wherein:
the sensor unit is configured to at least facilitate obtaining inputs for a plurality of different factors having an effect on energy performance for a vehicle; and
the processor is configured to at least facilitate determining a respective change in expected range, fuel economy, or both for the vehicle from each of the different factors based on the inputs; and
the display is configured to at least facilitate displaying, for a driver of the vehicle based on instructions provided by the processor, the respective change in expected range for each of the plurality of factors.

17. The vehicle of claim 15, wherein the processor is configured to at least facilitate determining the respective change in expected range for the vehicle from each of the different factors based on the inputs, by:
- determining the total difference between an actual distance travelled by the vehicle and the expected distance for the vehicle to travel due to the combination of the plurality of factors;
- determining, for each of the factors, the respective ratio of the efficiency score for the factor compared with the aggregate efficiency score for the combination of the plurality of factors in totality; and
- for each of the factors, multiplying the respective ratio for the factor by the total difference.

* * * * *